March 31, 1964 J. L. WHITE Re. 25,545

CASKET INTERIOR STRUCTURE

Original Filed May 23, 1960 4 Sheets-Sheet 1

INVENTOR.
JOHN L. WHITE
BY
Lockwood, Woodard, Smith & Weikart
ATTORNEYS

March 31, 1964 J. L. WHITE Re. 25,545

CASKET INTERIOR STRUCTURE

Original Filed May 23, 1960 4 Sheets-Sheet 2

INVENTOR.
JOHN L. WHITE
BY
Lockwood, Woodard, Smith & Weikart
ATTORNEYS

CASKET INTERIOR STRUCTURE

Original Filed May 23, 1960 4 Sheets-Sheet 3

INVENTOR.
JOHN L. WHITE
BY
Lockwood, Woodard, Smith & Weikart
ATTORNEYS

CASKET INTERIOR STRUCTURE

Original Filed May 23, 1960 4 Sheets-Sheet 4

INVENTOR.
JOHN L. WHITE
BY
Lockwood, Woodard, Smith & Wilbert
ATTORNEYS

United States Patent Office

Re. 25,545
Reissued Mar. 31, 1964

25,545

CASKET INTERIOR STRUCTURE

John L. White, Knightstown, Ind., assignor, by direct and mesne assignments, of sixty percent to Jacwill Mfrs., Knightstown, Ind., a partnership, and forty percent to Bruce Elder, Ferndale, Mich.

Original No. 3,077,016, dated Feb. 12, 1963, Ser. No. 30,834, May 23, 1960. Application for reissue Nov. 29, 1963, Ser. No. 289,151
8 Claims. (Cl. 27—19)

Matter enclosed in heavy brackets [ ] appears in the original patent but forms no part of this reissue specification; matter printed in italics indicates the additions made by reissue.

This invention relates generally to casket interior construction and particularly to a novel interior unit for a casket top.

There are disclosed in the prior art various corrugated board structures for installation in a casket top, the structures serving to support, without additional framework, the outer, decorative fabric lining the casket top. An example of such prior art structure is disclosed in Hillenbrand et al. Patent 2,664,615.

With regard to the present invention, the casket interior unit includes a base member, generally of rectangular configuration, to which are attached frame members having a pre-molded transverse curvature. The ends of the frame members are given a predetermined miter so that when installed in a casket they can be accurately mated. The base and frame members are joined prior to installation of the unit in a casket and the covering fabric is applied and held at the base-frame member junctions but is not otherwise fastened to the frame members prior to installation of the unit in a casket. The unit of the present invention is then placed in the casket top and the pre-molded frame members are tacked, stapled or otherwise fastened to the wood strips conventionally extending along the sides of the casket top. The free outer margin of the fabric covering the frame members is also held by the tacks or staples securing the frame members to the casket tacking strips. The unit does not assume its final shape until secured within the casket and the frame members are not joined to each other along their mitered ends, this arrangement permitting variations in the casket interior dimensions to be accommodated without destroying the over-all finished appearance of the casket interior after the unit of the present invention is installed.

It is the primary object of the present invention, therefore, to provide a casket top interior unit which can be easily and conveniently installed so as to present a neat, finished appearance and which is constructed so as to accommodate variations in casket interior dimensions.

A further object of the present invention is to provide a casket top interior unit formed of corrugated paper board wherein the frame members are formed so as to have their outer walls, at the side margins of the frame members, extended beyond the corrugated component to thereby provide a strip of reduced thickness for tacking or stapling to the casket strips permitting this operation to be accomplished without crushing the corrugated board or fabric of which the unit is constructed.

A further object of the present invention is to provide a structure of the type referred to which can be conveniently formed so that one frame end member is offset vertically from the opposite end member and which can thus accommodate itself to the contour of caskets of various types.

A further object of the present invention is to provide a unit of the type described which can be installed by relatively unskilled personnel and does not require the work of skilled upholsterers.

The full nature of the invention will be understood from the accompanying drawings and the following description and the claims.

Referring initially to FIGS. 1–8, there is shown generally at 10, a conventional casket having hinged top or lid structure 11. Within the top structure there is disposed the interior unit of the present invention, indicated generally at 12, and covered with a suitable aesthetically pleasing fabric.

Figure 1:
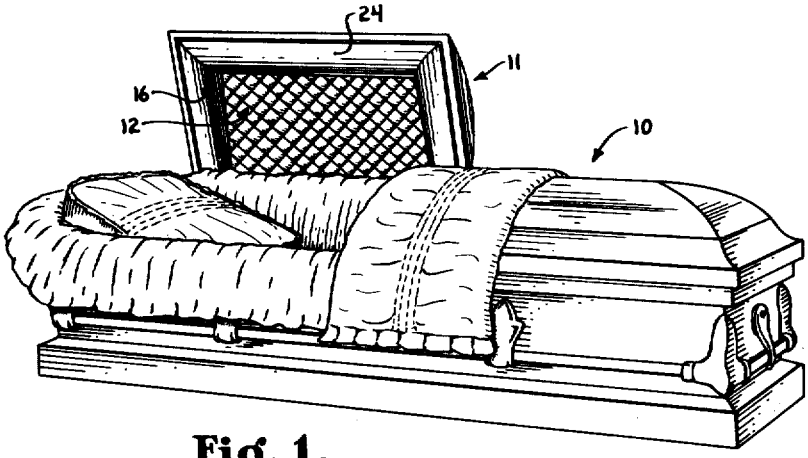
FIG. 1 is a perspective view of a conventional casket showing the interior unit of the present invention installed therein.
Figure 2:
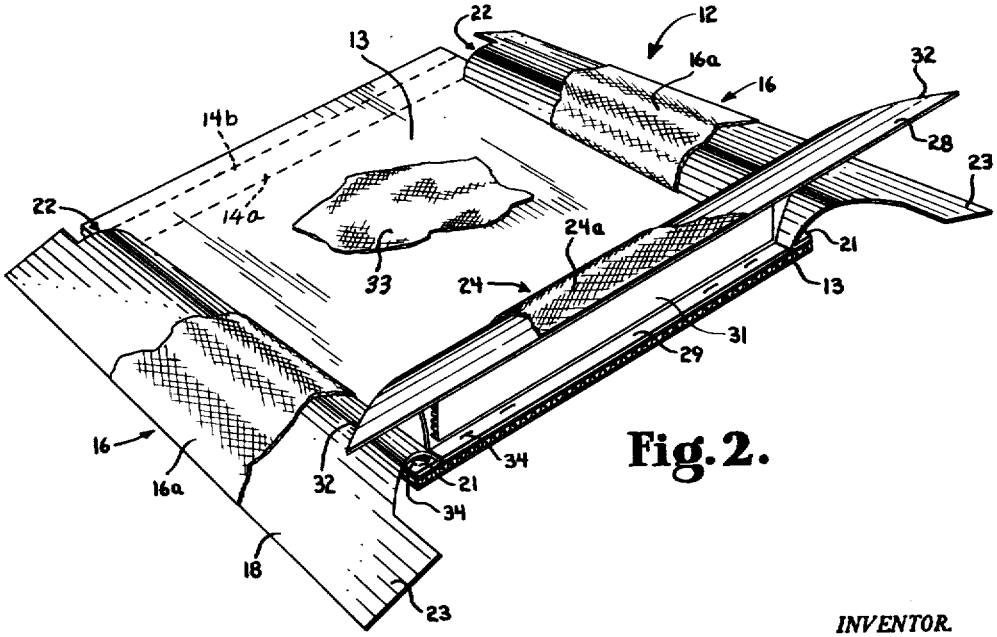
FIG. 2 is a perspective view of the interior unit of the present invention prior to installation in a casket.
Figure 3:
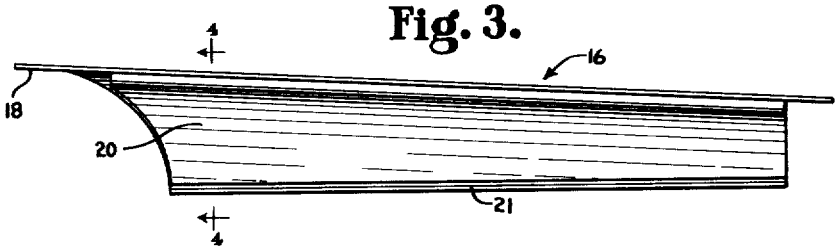
FIG. 3 is a side view of one of the frame end members which is a component of the assembly of FIG. 2.

The interior unit of the present invention is shown in detail in FIG. 2 and includes a flat, generally rectangular base member 13 which may have score lines 14a and 14b along one side margin thereof. The base member may be formed of paper-mache or similar material but is preferably formed of corrugated paper board as indicated in FIG. 2.

Figure 4:
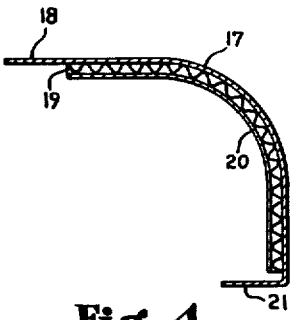
FIG. 4 is a sectional view taken generally along the line 4—4 of FIG. 3.
Figure 5:
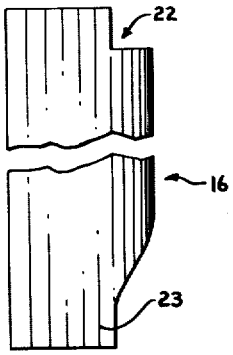
FIG. 5 is a top plan view of the frame member of FIG. 3.
Figure 7:
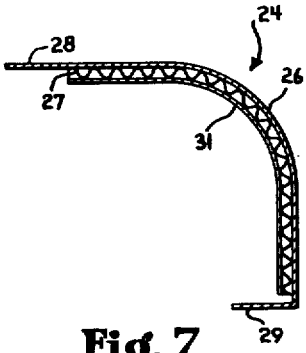
FIG. 7 is a sectional view taken generally along the lines 7—7 of FIG. 6.
Figure 6:
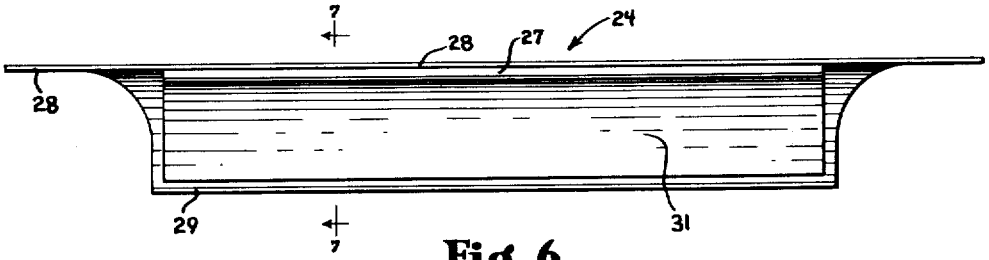
FIG. 6 is a side view of the frame side member which is a component of the assembly of FIG. 2.
Figure 8:
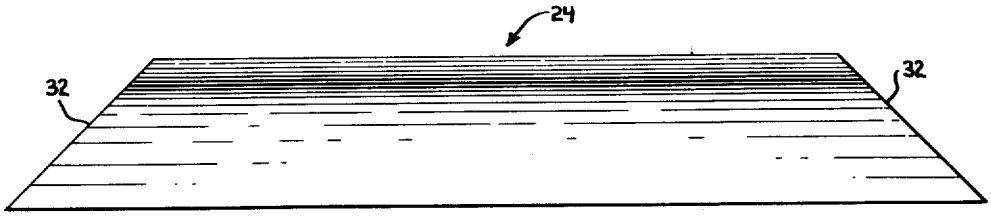
FIG. 8 is a top plan view of the frame member of FIG. 6.

Adjacent the end margins of the base member there are positioned frame end members 16. The two members 16 are identical and one of these members is shown in detail in FIGS. 3–5. As will be there apparent the members 16 are preferably formed of corrugated paper board and are, in cross section, provided with a pre-molded concavo-convex configuration (FIG. 4). The outer liner or wall 17 extends outwardly, at the top side margin of the member 16, the portion 18 of the outer liner extending beyond the corrugated or fluted component of the member 16. Along the lower side margin of the member 16 the outer liner 17 also extends beyond the fluted component 19, this extending portion 21 being scored so that it may be folded outwardly along its length as indicated in FIG. 4. As indicated in FIG. 5 the members 16 are each notched at 22 so as to accommodate the extending end of the base member 13, permitting it to be folded upwardly along the score line 14a. The base member 13 is further folded outwardly along the score line 14b to form a tab 14c so that a cross section of the base member transverse to the score lines 14a and 14b would appear Z-shaped after folding. The tab 14c is adapted to be secured to a nailing strip within the casket lid by some suitable means such as nails or staples. The inner liner component 20 underlies only the fluted component 19 and terminates adjacent the tabs 18 and 21. At its opposite end a portion of the member 16 is cut away leaving an extending tab 23. As will be evident in FIG. 3, and also in FIG. 2, the height of the frame members 16 diminishes from one end to the other so that the ends thereof adjacent the notched outer portions 22 are lower than the ends carrying the tabs 23.

Referring again to FIG. 2, there is disposed at one side margin of the base member 13 a side frame member indicated generally at 24. The side frame member is preferably formed of corrugated paper board and is shown in detail in FIGS. 6–8. As will be evident from FIG. 7 the member 24 is pre-molded into a cross-sectionally concavo-convex configuration. The outer liner or wall 26 extends outwardly along the upper side margin of the member 24 beyond the corrugated or fluted component 27 to form the tab 28. Similarly, the outer liner 26 extends beyond the fluted component at the lower margin of the member 24 to form the tab 29. The lower extending portion forming the tab 29 is appropriately scored to permit it to be folded outwardly as viewed in FIG. 7. The inner liner component 31 overlies only the fluted component of the corrugated board and terminates adjacent the tabs 28 and 29. As will be evident from FIG. 8, the ends of the member 24 are cut at 32 so that the ends conform to the convex surface of the frame member 16. The cut is shown as being substantially diagonal but conceivably it could be otherwise.

Figure 12:
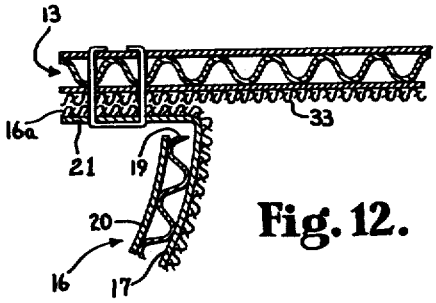
FIG. 12 is an enlarged fragmentary view of a further portion of FIG. 10.

Referring to FIG. 2, the assembly of the unit prior to its installation in a casket top will now be described. The base member 13 is covered by a suitable fabric shown fragmentarily at 33. Only a portion of the fabric 33 is shown, however, it will be understood that it extends outwardly at least to the margins of the base member. The end members 16 and the side member 24 are also covered with a suitable contrasting or matching fabric, a portion of which is shown at 16a and 24a respectively. The fabric terminates adjacent the outer margins of the members 16 and 24 and extends downwardly so as to underlie the tabs 21 on the members 16 and to underlie the tab 29 on the member 24. As will be evident from FIGS. 2 and 12, the junction between the base member 13 and the members 16 and 24 may be made by stapling as indicated at 34. Thus, a single liner thickness, defined by the tab 21, for example, is stapled to the full thickness of the corrugated board making up the base member 13 with the margins of the fabric 16a and 33 being rigidly fastened therebetween. With the assembly completed as indicated in FIG. 2, it should be noted that the members 16 and the member 24 are not secured together but are fastened only along their lower margins to the member 13.

Figure 9:
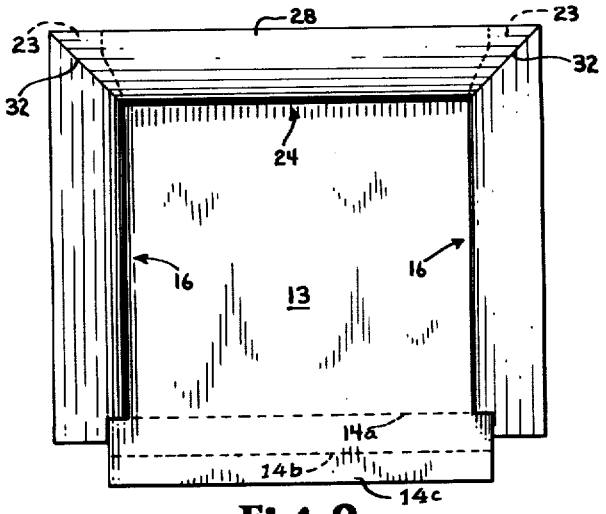
FIG. 9 is a top plan view of the assembly of FIG. 2 but showing the frame members disposed in the positions which they assume when the unit is installed in a casket.
Figure 10:
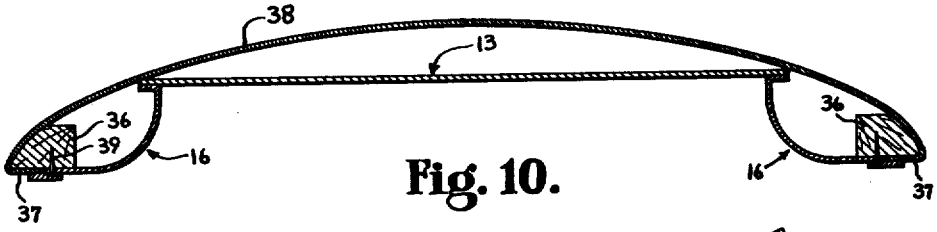
FIG. 10 is a sectional view through the casket top showing the unit of the present invention installed therein.
Figure 11:
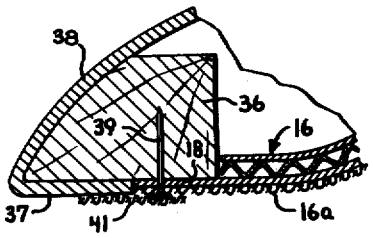
FIG. 11 is an enlarged fragmentary view of a portion of FIG. 10.

Installation of the assembly of FIG. 2 within a casket top will now be described with reference to FIGS. 9–11. In FIGS. 9 and 10 the fabric has been omitted therefrom so that the primary constructional features will not be obscured. Conventional casket construction normally includes longitudinally extending wood tacking strips 36 (FIG. 10) which are enclosed within the inturned marginal edge 37 of the domed casket top 38. The assembly of FIG. 2, with the members 16 and 24 unjoined, is inserted in the casket top with the convex surface of the frame members 16 and 24 facing outwardly as indicated in FIG. 10. The unit is positioned within the casket top as indicated in FIG. 11 so that each tab 18 overlies a portion of the tacking strip 36 with its end closely adjacent the margin of the inturned portion 37 of the casket top wall. The tabs 18 and the fabric 16a overlying the tabs may then be tacked at spaced points to the strips 36 with one of the tacks being indicated at 39 in FIG. 11. The line of junction of the casket top wall portion 37 and the tab 18 may be suitably masket or covered by means of a strip of braid or the like as indicated at 41. Correspondingly, the tab 28 of the member 24 and its overlying fabric 24a may be tacked to the conventional transverse tacking strip (not shown) and suitably masket by braid or the like. It will be noted that, as shown in FIG. 9, the tab 28 formed at the outer margin of the member 24 overlies the tabs 23 formed at the ends of the members 16 so that when the ends of the tab 28 are tacked the tacks also secure the ends of the members 16. Since a considerable portion of the members 16 underlies the end portions of the member 24 it will be evident that in tacking in the member 24 considerable latitude in positioning the member 24 with relation to the members 16 may be exercised without destroying the finished, mitered corner effect at the margins 32 of the member 24. It will be further understood that the fabric 16a and 24a covering the members 16 and 24 passes inwardly at the margins 32 so that the edges of the fabric extend below the members 16 and 24 as viewed in FIG. 9. The lower, scored marginal area of the base member 13 may be tacked or otherwise secured to a tacking strip (not shown) adjacent the casket top hinges. The decrease in height along the length of the member 16 provides a thinning or tapering of the roll toward the lower margin of the casket top as will be evident from FIG. 1. The extension of the outer liner components 17 and 26 of the members 16 and 24 respectively provides the ledges or tabs 18 and 28 whereby the unit may be fastened into the casket without crushing the corrugated board or wrinkling the fabric. Since the thickness of the tabs 18 and 28 is generally the same as the thickness of the inturned portion 37 of the casket top, a generally smooth surface is provided at the junction of the tabs and the casket wall which can be conveniently masked by braid or a fabric strip as previously pointed out. Since the frame members 16 and 24 are not joined to each other until fitted within the casket, variations in casket interior dimensions may be accommodated without destroying the finished appearance of the unit.

Figure 13:
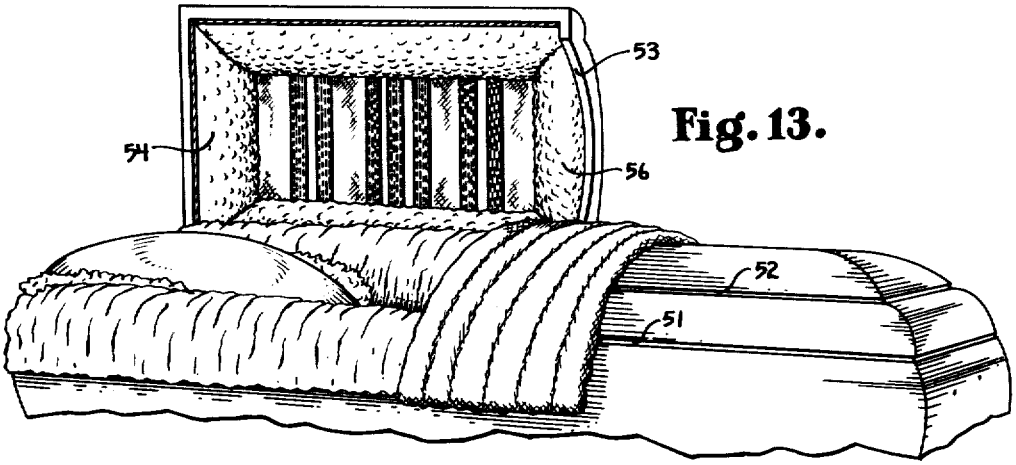
FIG. 13 is a perspective view of a conventional casket of a type differing from that of FIG. 1 and showing a modified form of the unit of the present invention installed therein.
Figure 14:
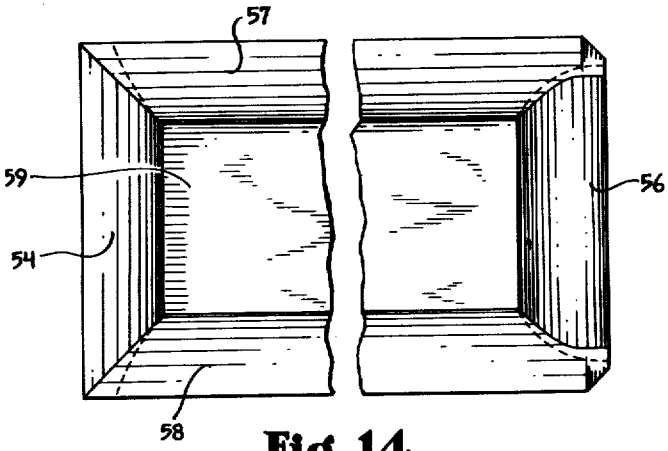
FIG. 14 is a top plan view of the modified form of the unit of the present invention.
Figure 15:
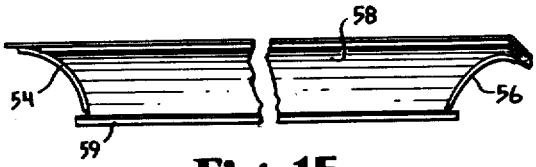
FIG. 15 is a side view of the structure shown in FIG. 14.

Referring now to FIGS. 13–15, there will be disclosed a modified form of the interior unit of the present invention which is particularly adapted for use in conventional caskets of the type known in the trade as the perfection type casket. Such a casket is shown in FIG. 13 and differs from the type of casket shown in FIG. 1 primarily in that the casket top is arranged to open along the line 51 rather than along the line 52 as is the case with the structure of FIG. 1. In this type of casket construction the end of the casket top indicated at 53 is arched somewhat, that is, cut back in an arched configuration. The interior unit for this type of casket utilizes two concavo-convex side frame members and the end frame member adjacent the arched portion 53 is lower, that is has less height, than the opposite frame end member.

The assembly of this modified form of the unit is identical to that of the unit disclosed in FIG. 2 and it is inserted into the casket top with the frame end members 54, 56 and frame side members 57, 58 secured to the base member 59 only. When installed in the casket of FIG. 13, the frame members are positioned as indicated in FIG. 14 and tacked or otherwise fastened to the adjacent wood strip forming a part of the casket construction. As will be evident from FIG. 15, the frame members 54, 56, 57 and 58 are formed of corrugated board with the outer liner or wall extending beyond the fluted component of the board to provide tabs for attaching the frame members to the base 59 and to provide extending tabs for tacking or otherwise fastening the outer margins of the frame members to the casket. The frame members are pre-molded to their concavo-convex cross-sectional configuration and, as will be evident from FIG. 15, the end frame member 56 has a sharper curvature to give this member a reduced height as compared to the opposite end frame member 54. This arrangement is such that when the unit is installed in the casket shown in FIG. 13, the end frame member 56 is displaced somewhat with relation to the end frame member 54 so that the arched portion 53 of the casket top is accommodated. It will be understood that while specific designation of the fabric covering for the unit has been omitted from FIGS. 14 and 15, such fabric is applied to the unit in the same fashion as disclosed in FIGS. 2, 11 and 12.

The casket interior unit of the present invention is formed from a structure which does not assume its final shape until it is fastened within the casket. This arrangement allows minor variations in casket interior dimension to be accommodated. Extension of the outer liner or wall of the frame members to provide fastening strips permits the base to be assembled to the frame members and the frame members to be fastened to the casket top without crushing the corrugated board or distorting the covering fabric. Further, the unit of the present invention may be assembled to the point indicated in FIG. 2 by relatively unskilled personnel. The free condition of the frame members when so assembled permits the unit to be installed in a casket by relatively unskilled personnel with the final fastening into the casket top being flexible enough to permit the unit to be used in caskets which vary relatively widely as to interior dimension. This flexibility is made possible by the arrangement whereby the mitered joints at the installed frame member corners are obtained by overlapping of the frame members rather than butting of the frame members. While the unit of the present invention has been described herein as accommodating half couch casket tops, it will be understood that the features of the unit are equally present when the structure is fabricated for use in full couch casket types. Reference has herein been made to corrugated paper board which is premolded to the desired configuration. It will be understood that certain of the inventive features could also be achieved by utilizing any other suitable material formed of laminations which can be molded to hold the desired shape.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

What is claimed is:

1. In a casket top an interior unit inserted therein comprising a flat generally rectangular base member formed of sheet material, a plurality of side frame members respectively disposed along at least three sides of said rectangular base member, said frame members being formed of sheet material formed to a cross sectional concavo-convex configuration curving outwardly from said base member, said sheet material forming said frame members being bent along the inner margin of said frame members and fastened to said rectangular base member, each of said frame members abutting the frame members disposed along adjacent sides of said rectangular base member to form a plurality of corner assemblies, one of said frame members in each of said corner assemblies normally extending materially beyond the line of juncture with the other frame member comprising said corner assembly, said other frame member terminating at its abutting end along a line conforming to the convex surface of said one frame member so that said other frame member overlaps said one frame member, said other frame member being adjustable along the length of said one frame member whereby said abutting end may be located to adjust to the specific dimensions of the casket top in which said interior unit is inserted, the convex sides of said frame members being disposed outwardly, the outer margins of said frame members being adapted to be fastened to said casket top.

2. The invention as defined in claim 1 in which there are three frame members with two thereof being parallel and the third frame member being transverse thereto, said parallel frame members diminishing in height along their length with their maximum height being at the ends adjacent said third frame member.

3. The invention as defined in claim 1 in which there are four frame members with the height of one of said frame members being less than that of the opposite frame member.

4. An interior unit adapted to be inserted in a casket top comprising a flat generally rectangular base formed of sheet material, a plurality of side frame members respectively disposed along at least three sides of said rectangular base member, said frame members being formed of sheet material formed to a cross-sectional concavo-convex configuration curving outwardly from said base member, said frame members being fastened along their inner margins to said base member, each of said frame members abutting the frame members disposed along adjacent sides of said rectangular base member to form a plurality of corner assemblies, one of said frame members in each of said corner assemblies normally extending materially beyond the line of juncture with the other frame member comprising said corner assembly so that said other frame member overlies a portion of the convex surface of said one frame member, said other frame member terminating at its abutting end along a line conforming to the convex surface of said one frame member, said other frame member being adjustable along the length of said one frame member whereby said abutting end may be located to adjust to the specific dimensions of the casket top in which said interior unit is to be inserted, the convex sides of said frame members being disposed outwardly.

5. An interior unit adapted to be inserted in a casket top comprising a flat generally rectangular base member formed of sheet material, a plurality of side members respectively disposed along at least three sides of said rectangular base member, said frame members being formed of sheet material formed to a cross-sectional concavo-convex configuration curving outwardly from said base member, said frame members being fastened along their inner margins to said rectangular base member, each of said frame members abutting the frame members disposed along adjacent sides of said rectangular base member to form a plurality of corner assemblies, one of said frame members in each of said corner assemblies normally extending materially beyond the line of juncture with the other frame member comprising said corner assembly, said other frame member terminating at its abutting end along a line conforming to the convex surface of said one frame member so that said other frame member overlaps said one frame member, said other frame member being adjustable along the length of said one frame member whereby said abutting end may be located to adjust to the specific dimensions of the casket top in which said interior unit is inserted, the convex sides of said frame members being disposed outwardly, the outer margins of said frame members being adapted to be fastened to said casket top.

6. *An interior unit in a casket top comprising a panel member of a generally rectangular configuration, a plurality of frame members respectively disposed along at least three sides of said panel member, said frame members being formed to a cross sectional concavo-convex configuration curving outwardly from said panel member, said frame members being contiguous to said panel member along their inner margins, each of said frame members abutting the frame members disposed along adjacent sides of said panel member to form a plurality of corner assemblies, one of said frame members in each of said corner assemblies normally extending materially beyond*

*the line of juncture with the other frame member comprising said corner assembly, said other frame member terminating at its abutting end along a line conforming to the convex surface of said one frame member so that said other frame member overlaps said one frame member, said other frame member being adjustable along the length of said one frame member whereby said abutting end may be located to adjust to the specific dimensions of the casket top in which said interior unit is mounted, the outer margins of said frame members engaging said casket top.*

*7. An interior unit adapted to be inserted in a casket top comprising a base member having substantially four sides and formed of sheet material, a plurality of side frame members respectively disposed along at least three sides of said rectangular base member, said frame members being formed of sheet material formed to a cross-sectional concavo-convex configuration curving outwardly from said base member, said frame members being fastened along their inner margins to said base member, each of said frame members abutting the frame members disposed along adjacent sides of said rectangular base member to form a plurality of corner assemblies, one of said frame members in each of said corner assemblies normally extending materially beyond the line of juncture with the other frame member comprising said corner assembly so that said other frame member overlies a portion of the convex surface of said one frame member, said other frame member terminating at its abutting end along a line conforming to the convex surface of said one frame member, said other frame member being adjustable along the length of said one frame member whereby said abutting end may be located to adjust to the specific*

*dimensions of the casket top in which said interior unit is to be inserted, the convex sides of said frame members being disposed outwardly.*

*8. An interior unit in a casket comprising a panel member of a generally rectangular configuration, a plurality of frame members respectively disposed along at least three sides of said panel member, said frame members being formed to a cross sectional concavo-convex configuration curving outwardly from said panel member, said frame members being connected to said panel member along their inner margins, each of said frame members abutting the frame members disposed along adjacent sides of said panel member to form a plurality of corner assemblies, one of said frame members in each of said corner assemblies normally extending materially beyond the line of juncture with the other frame member comprising said corner assembly, said other frame member terminating at its abutting end along a line conforming to said surface of said one frame member so that said other frame member overlaps said one frame member, said other frame member being adjustable along the length of said one frame member whereby said abutting end may be located to adjust to the specific dimensions of the casket in which the interior unit is mounted, the outer margins of said frame members engaging said casket.*

References Cited in the file of this patent or the original patent

UNITED STATES PATENTS

| | | |
|---|---|---|
| 2,664,615 | Hillenbrand et al. | Jan. 5, 1954 |
| 2,867,030 | Hillenbrand | Jan. 6, 1959 |
| 2,878,983 | Dulaney | Mar. 24, 1959 |